(12) United States Patent
Nakayama

(10) Patent No.: US 10,794,264 B2
(45) Date of Patent: Oct. 6, 2020

(54) COOLANT TANK

(71) Applicant: TOYOTA JIDOSHA KABUSHIKI KAISHA, Toyota-shi (JP)

(72) Inventor: Takahiro Nakayama, Nissin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 113 days.

(21) Appl. No.: 16/267,459

(22) Filed: Feb. 5, 2019

(65) Prior Publication Data

US 2019/0249591 A1 Aug. 15, 2019

(30) Foreign Application Priority Data

Feb. 13, 2018 (JP) ................................ 2018-022980

(51) Int. Cl.
 F15C 1/16 (2006.01)
 F01P 11/02 (2006.01)
 B23Q 11/10 (2006.01)

(52) U.S. Cl.
 CPC ....... F01P 11/0204 (2013.01); F01P 11/0276 (2013.01); B23Q 11/1069 (2013.01); B23Q 11/1084 (2013.01)

(58) Field of Classification Search
 CPC .............. F01P 11/0204; F01P 11/0276; B23Q 11/1069; B23Q 11/1084
 USPC .... 137/808, 812, 811, 431, 432, 564, 589, 4
 See application file for complete search history.

(56) References Cited

U.S. PATENT DOCUMENTS

| 4,015,369 | A | * | 4/1977 | Dietrick | .................. | B01D 3/00 |
| | | | | | | 451/450 |
| 4,056,233 | A | * | 11/1977 | Fay | ....................... | B02C 19/061 |
| | | | | | | 241/39 |
| 4,542,775 | A | * | 9/1985 | Beck | ...................... | B01D 21/26 |
| | | | | | | 141/65 |
| 5,454,937 | A | * | 10/1995 | Lewandowski | .... | B01D 17/0211 |
| | | | | | | 210/104 |
| 5,800,104 | A | * | 9/1998 | Miyano | .................. | B01D 21/32 |
| | | | | | | 210/167.02 |
| 5,814,216 | A | * | 9/1998 | Filion | .................. | B01D 29/018 |
| | | | | | | 210/154 |
| 6,096,198 | A | * | 8/2000 | Underhill | ........... | B01D 17/0202 |
| | | | | | | 210/123 |
| 9,873,173 | B2 | * | 1/2018 | Morimura | .......... | B23Q 11/1069 |
| 2003/0218086 | A1 | * | 11/2003 | Bratten | .............. | B23Q 11/1069 |
| | | | | | | 241/101.2 |
| 2007/0235090 | A1 | * | 10/2007 | Thompson | .......... | B23Q 11/1069 |
| | | | | | | 137/574 |

(Continued)

FOREIGN PATENT DOCUMENTS

JP 7-3702 U 1/1995
JP 2003-71679 3/2003

*Primary Examiner* — Minh Q Le
(74) *Attorney, Agent, or Firm* — Oblon, McClelland, Maier & Neustadt, L.L.P.

(57) ABSTRACT

A coolant tank includes: a tank main body configured to store a coolant discharged from a processing machine; a vortex flow generator that creates a vortex flow of the coolant in the tank main body; and a float configured to float on a liquid surface of the coolant stored in the tank main body. An outer peripheral portion of the float has a shape conforming to a shape of an inner peripheral wall surface of the tank main body and forming a gap between the outer peripheral portion and the inner peripheral wall surface.

6 Claims, 4 Drawing Sheets

(56) References Cited

U.S. PATENT DOCUMENTS

| | | | |
|---|---|---|---|
| 2010/0206882 A1* | 8/2010 | Wessels | F01P 11/029 |
| | | | 220/562 |
| 2014/0116930 A1* | 5/2014 | Hori | B23Q 11/1069 |
| | | | 210/167.01 |
| 2014/0124418 A1* | 5/2014 | Ishihara | B23Q 11/1069 |
| | | | 210/86 |
| 2016/0184946 A1* | 6/2016 | Morimura | B23B 27/10 |
| | | | 137/572 |
| 2016/0229710 A1* | 8/2016 | He | C02F 1/325 |
| 2018/0073422 A1* | 3/2018 | Lindeblad | F01P 11/0204 |
| 2020/0047299 A1* | 2/2020 | Strombach | B01D 29/72 |

* cited by examiner

COOLANT TANK

INCORPORATION BY REFERENCE

The disclosure of Japanese Patent Application No. 2018-022980 filed on Feb. 13, 2018 including the specification, drawings and abstract is incorporated herein by reference in its entirety.

BACKGROUND

1. Technical Field

The disclosure relates to a coolant tank.

2. Description of Related Art

In a processing machine such as a machine tool or a polishing device, various kinds of processing are performed while a coolant is supplied to a workpiece or a cutting edge. The coolant used in the processing is temporarily collected and returned to a coolant tank and then sent to the processing machine again. However, the coolant collected from the processing machine includes sludge. For this reason, in the related art, various proposals for removing sludge from the coolant have been made, and for example, a coolant cleaning device aimed at avoiding accumulation of sludge at the bottom of the coolant tank is known (refer to Japanese Unexamined Patent Application Publication No. 2003-071679 (JP 2003-071679 A)).

SUMMARY

Incidentally, there is a case where bubbles are generated from the coolant. When bubbles are generated in the vicinity of a boundary between an inner peripheral wall surface of a tank main body and a liquid surface of the coolant and sludge adheres to the bubbles, there is a case where the sludge that has adhered to the bubbles accumulates into a mass and the mass grows. When the grown sludge mass falls into the tank main body, the mass clogs a coolant transfer flow path, and thus there is a possibility that the supply of the coolant may be unable to be performed. In JP 2003-071679 A, a countermeasure for such a situation is not assumed.

Therefore, a coolant tank disclosed in this specification has an object of suppressing the growth of a mass of sludge in a tank main body.

An aspect of the disclosure relates to a coolant tank. The coolant tank includes a tank main body configured to store a coolant discharged from a processing machine; a vortex flow generator that creates a vortex flow of the coolant in the tank main body; and a float configured to float on a liquid surface of the coolant stored in the tank main body and move on the liquid surface due to the vortex flow of the coolant to collide with an inner peripheral wall surface of the tank main body.

The shape of the inner peripheral wall surface of the tank main body and the shape of an outer peripheral portion of the float may be shapes similar to each other. Further, the outer peripheral portion of the float may have a shape conforming to the shape of the inner peripheral wall surface of the tank main body and a shape being defined such that a gap between the outer peripheral portion and the inner peripheral wall surface is formed. Further, each of the shape of the inner peripheral wall surface of the tank main body and the shape of the outer peripheral portion of the float may be a circular shape. Further, each of the shape of the inner peripheral wall surface of the tank main body and the shape of the outer peripheral portion of the float may be a rectangular shape. Further, the tank main body may store a coolant in which sludge is mixed.

With the aspects of the coolant tank according to the disclosure, it is possible to suppress the growth of a mass of sludge in the tank main body.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
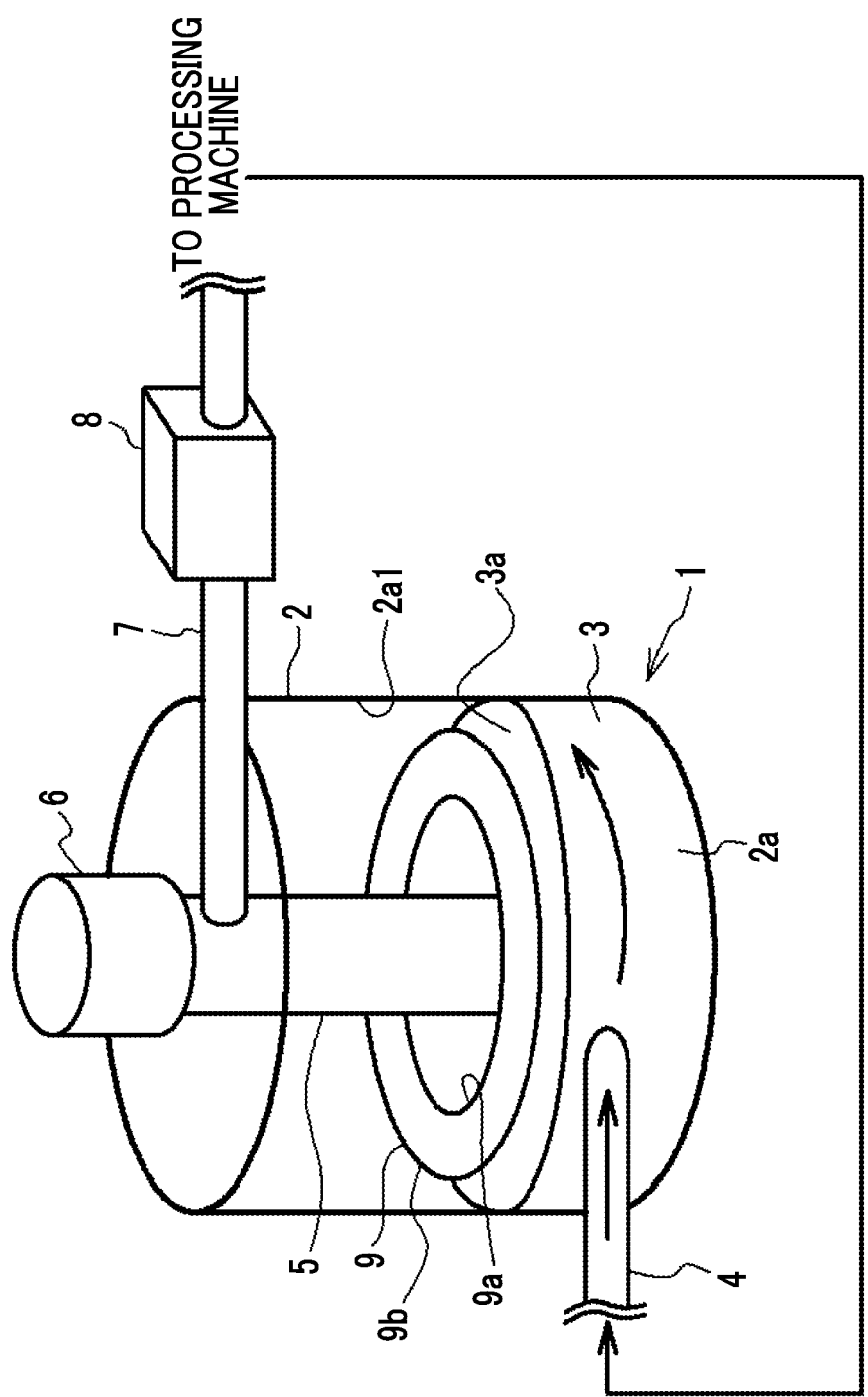
FIG. 1 is a perspective view schematically showing a coolant tank according to a first embodiment.

Hereinafter, embodiments of the disclosure will be described with reference to the accompanying drawings. Note that, for example, the dimensions and dimensional ratios of various parts illustrated in the drawings will not always completely coincide with the actual values. In some drawings, illustration of details will be omitted.

Embodiments

Figure 2:
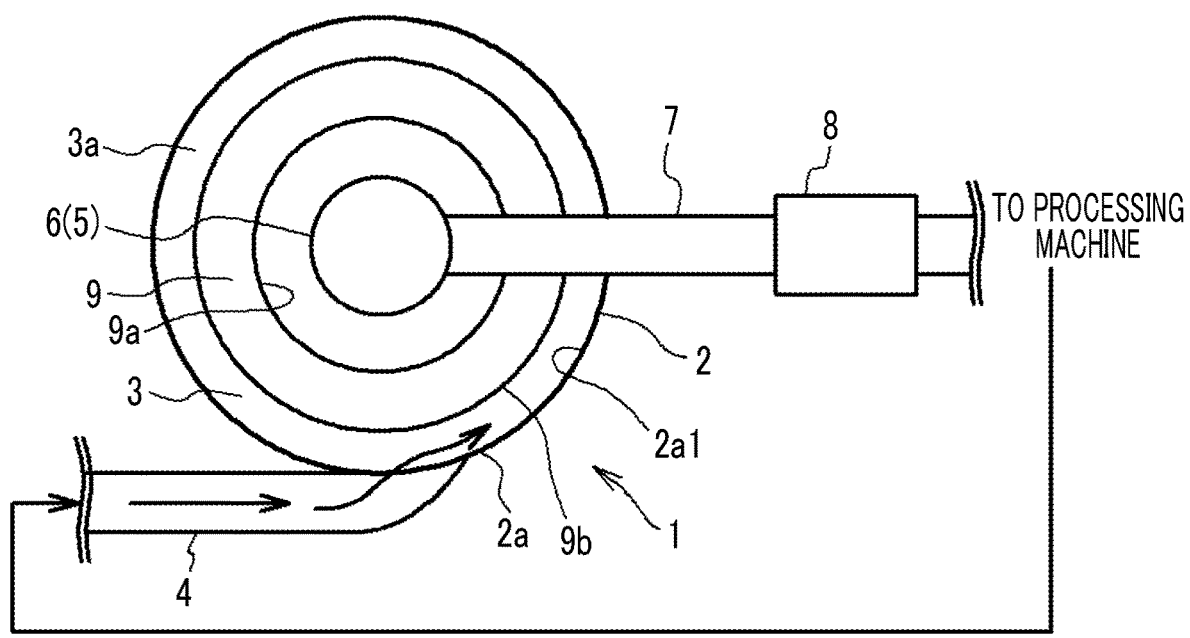
FIG. 2 is a plan view schematically showing the coolant tank according to the first embodiment.

First, a coolant tank 1 of a first embodiment will be described with reference to FIG. 1 and FIG. 2. The coolant tank 1 includes a tank main body 2 in which a coolant 3 is stored, and an introduction pipe 4 for introducing the coolant 3 discharged from a processing machine into the tank main body 2. Further, the coolant tank 1 is provided with a pump 5 disposed in the tank main body 2, and a motor 6 which drives the pump 5. One end of a discharge pipe 7 for transferring the coolant 3 to the processing machine is connected to the pump 5. The discharge pipe 7 is provided with a magnetic separator 8 configured to attract and collect the sludge mixed in the coolant and then discharge the coolant to the processing machine. The coolant tank 1 is provided with a float 9 that floats on a liquid surface 3*a* of the coolant 3 stored in the tank main body 2. The float 9 has an annular shape, and includes an inner peripheral portion 9*a* and an outer peripheral portion 9*b*.

The processing machine described above may be any machine configured to perform machining while being supplied with the coolant 3. For example, a lathe, a polishing device, or a grinding machine may be used as the processing machine described above.

The tank main body 2 in this embodiment has a bottomed cylindrical shape. Therefore, an inner peripheral wall surface 2*a*1 of a side wall 2*a* of the tank main body 2 is a circular shape. The float 9 has a shape conforming to the shape of the inner peripheral wall surface 2*a*1 of the tank main body 2 so as to correspond to the shape of the inner peripheral wall surface 2*a*1 as described above. Specifically, the shape of the outer peripheral portion 9*b* of the float 9 of this embodiment is a circular shape.

The outer peripheral portion 9*b* of the float 9 has such a shape as to form a gap between the outer peripheral portion 9b and the inner peripheral wall surface 2a1 of the tank main body 2 and can sequentially come into contact with the inner peripheral wall surface 2a1 of the tank main body 2 over the entire circumference of the inner peripheral wall surface 2a1.

The float 9 crushes bubbles of the coolant 3 or masses of sludge between the inner peripheral wall surface 2a1 of the tank main body 2 and the outer peripheral portion 9b of the float 9, as will be described later. For this reason, it is favorable that the float 9 is an object that can collide with the inner peripheral wall surface 2a1 of the tank main body 2. However, in terms of more effectively crushing the bubbles of the coolant 3 or the masses of sludge, it is desirable that the shape of the inner peripheral wall surface 2a1 and the shape of the outer peripheral portion 9b are similar to each other. For example, even though one of the shape of the inner peripheral wall surface 2a1 and the shape of the outer peripheral portion 9b is a quadrangular shape and the other is a circular shape or one is a quadrangular shape and the other is a triangular shape, the float 9 can collide with the inner peripheral wall surface 2a1 of the tank main body 2 to crush the bubbles of the coolant 3 or the masses of sludge. However, in such a form, a location where the gap between the inner peripheral wall surface 2a1 and the outer peripheral portion 9b becomes large appears. In the location where the gap between them becomes large, it is difficult to crush the bubbles of the coolant 3 or the masses of sludge.

The outer peripheral portion 9b of the float 9 in this embodiment has a shape similar to the shape of the inner peripheral wall surface 2a1, and therefore, the outer peripheral portion 9b can follow the inner peripheral wall surface 2a1. In this way, it is possible to effectively crush the bubbles of the coolant 3 or the masses of sludge.

The introduction pipe 4 is mounted on the side wall 2a such that an opening portion thereof is open obliquely with respect to the inner peripheral wall surface 2a1 of the tank main body 2 that is circular. The introduction pipe 4 is an example of a vortex flow generator that creates a vortex flow of the coolant 3 in the tank main body 2. The introduction pipe 4 discharges the coolant 3 so as to follow the inner peripheral wall surface 2a1, and therefore, a vortex flow of the coolant 3 can be created in the tank main body 2. The float 9 floating on the liquid surface 3a of the coolant 3 flows with the vortex flow of the coolant 3 and moves within the tank main body 2 to collide the outer peripheral portion 9b against the inner peripheral wall surface 2a1 of the tank main body 2. In this way, it is possible to crush the bubbles of the coolant 3 or the masses of sludge.

It is favorable that the introduction pipe 4 is mounted on the side wall 2a such that the coolant 3 that is discharged from the introduction pipe 4 forms a vortex flow in the tank main body 2. For example, when the introduction pipe 4 is mounted so as to extend in a normal direction to the circular shape of the inner peripheral wall surface 2a1, it is difficult for the coolant 3 that is discharged to form a vortex flow. Therefore, it is desirable that the introduction pipe 4 is mounted so as to discharge the coolant 3 in a direction deviating from the normal direction to the circular shape of the inner peripheral wall surface 2a1.

The introduction pipe 4 in this embodiment discharges the coolant 3 pumped up by the pump 5 and supplied to the processing machine through the discharge pipe 7 into the tank main body 2 again, thereby creating a vortex flow. For this reason, in this embodiment, special power for creating a vortex flow is not needed. However, since the introduction pipe 4 is an example of a vortex flow generator, it is also possible to adopt, for example, a rotary blade installed in the tank main body 2, instead of the introduction pipe 4 or together with the introduction pipe 4. Further, a flow regulating plate for determining a flow direction of the coolant 3 may be mounted.

The pump 5 has a cylindrical shape and is provided at a center portion of the tank main body 2. The motor 6 is installed at an upper portion of the pump 5. The reason why the pump 5 is provided at the center portion of the tank main body 2 is for causing the vortex flow of the coolant 3 not to be inhibited as much as possible. Further, when the pump 5 is located near the inner peripheral wall surface 2a1 of the tank main body 2, it is conceivable that bubbles accumulate between the pump 5 and the inner peripheral wall surface 2a1 and sludge accumulates. It is difficult for the bubbles or the masses of sludge generated in such a place to be crushed by the float 9. Therefore, in this embodiment, the pump 5 is provided at the center portion of the tank main body 2, which is separated from the inner peripheral wall surface 2a1.

The float 9 in this embodiment is annular and floats on the liquid surface 3a of the coolant 3 in a state where the pump 5 having a cylindrical shape is inserted into the float 9. The diameter of the inner peripheral portion 9a of the float 9 is set such that a gap is formed between the inner peripheral portion 9a and the pump 5. This gap is set to a dimension capable of allowing the contact of the outer peripheral portion 9b with the inner peripheral wall surface 2a1 of the tank main body 2. That is, the float 9 has such a shape that the outer peripheral portion 9b can come into contact with and be separated from the inner peripheral wall surface 2a1. This is because when the inner peripheral portion 9a comes into contact with the pump 5 and the outer peripheral portion 9b cannot come into contact with the inner peripheral wall surface 2a1, the bubbles of the coolant 3 or the masses of sludge cannot be crushed. The float 9 needs merely to be able to float on the liquid surface 3a of the coolant 3, and thus it can be formed of a material such as styrene foam. However, the material is not limited thereto.

In the coolant tank 1 of this embodiment, the coolant 3 discharged into the tank main body 2 through the introduction pipe 4 forms a vortex flow and moves the float 9 to crush the bubbles and the masses of sludge between the outer peripheral portion 9b of the float 9 and the inner peripheral wall surface 2a1. The circular float 9 moves while rotating and sequentially comes into contact with the entire circumference of the inner peripheral wall surface 2a1. For this reason, adhering of the bubbles to the entire circumference of the inner peripheral wall surface 2a1 and growth of the mass of sludge can be suppressed.

The crushed sludge is pumped up by the pump 5 in a fine state. The pumped-up sludge is adsorbed and recovered in the magnetic separator 8. Since the sludge is in a state of being made finer, it is properly removed without clogging up the discharge pipe 7 or the like, and thus the coolant 3 can be used again.

Figure 3:
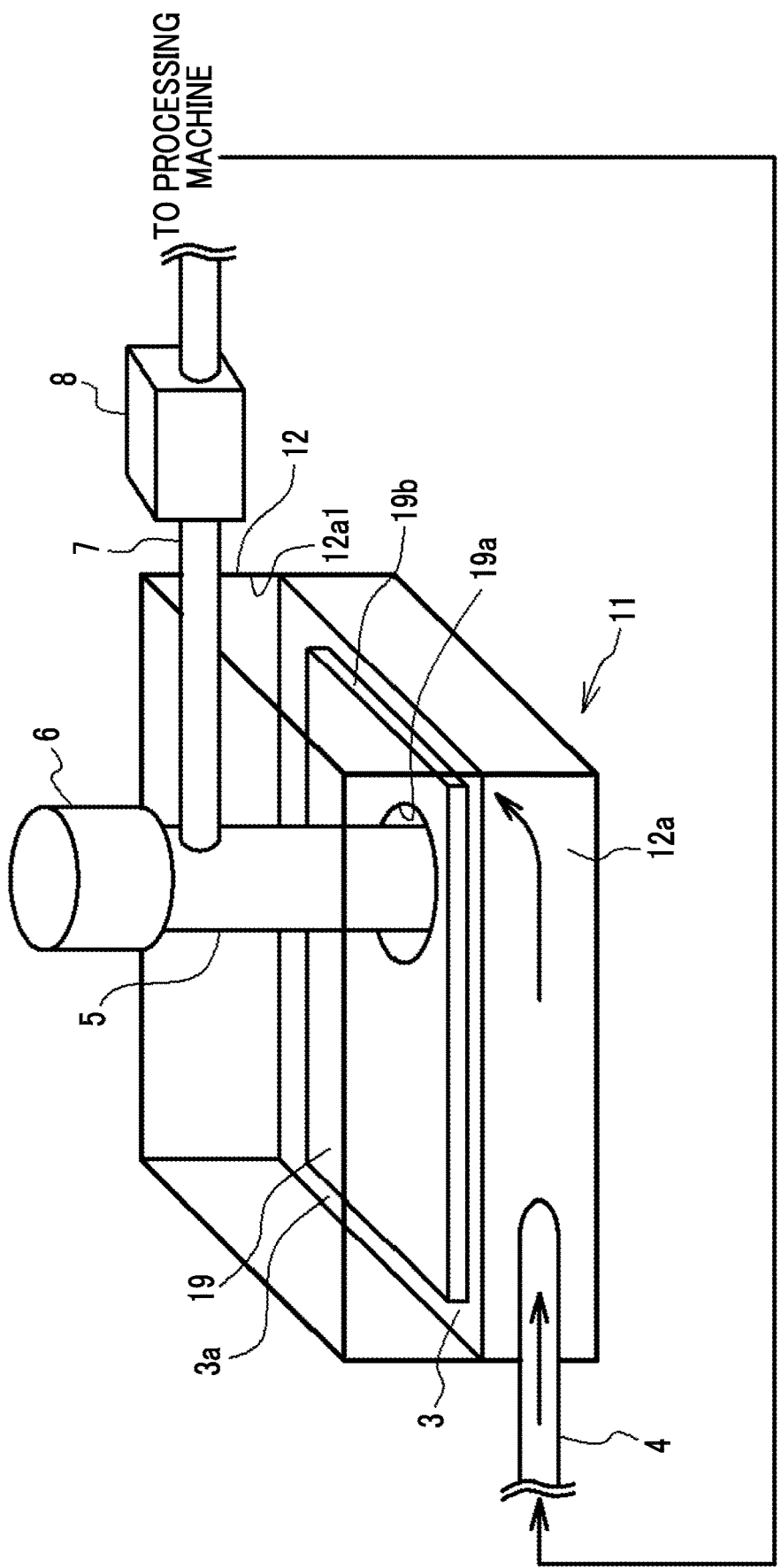
FIG. 3 is a perspective view schematically showing a coolant tank according to a second embodiment.
Figure 4:
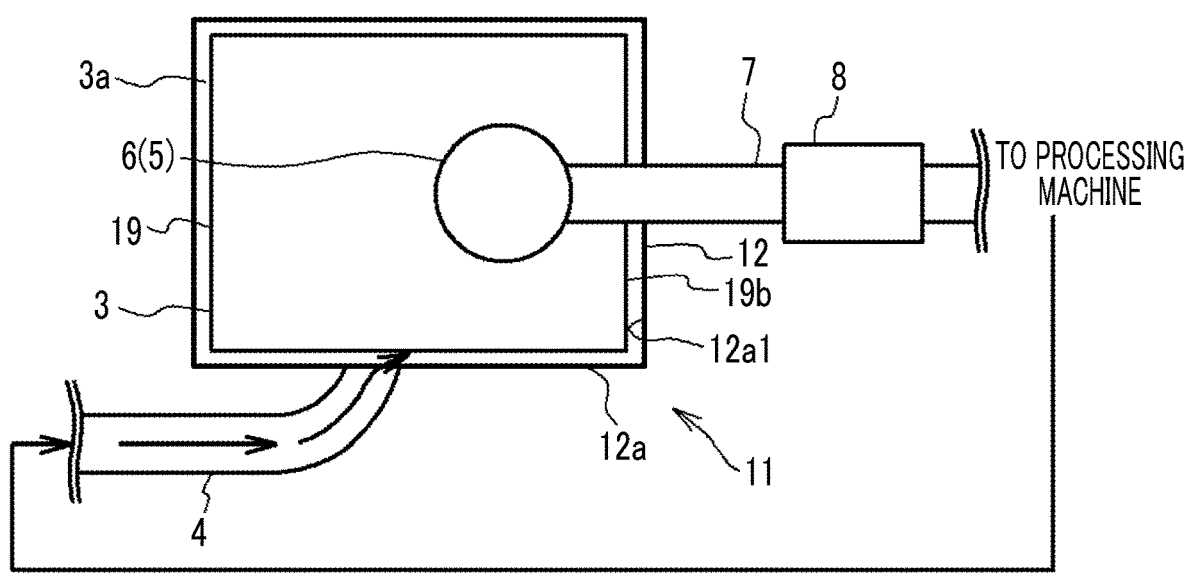
FIG. 4 is a plan view schematically showing the coolant tank according to the second embodiment.

Next, a second embodiment will be described with reference to FIG. 3 and FIG. 4. A coolant tank 11 of the second embodiment is different from the coolant tank 1 in the following points. The shape of the inner peripheral wall surface 2a1 of the tank main body 2 of the coolant tank 1 and the shape of the float 9 are circular, whereas each of the shape of an inner peripheral wall surface 12a1 of a tank main body 12 of the coolant tank 11 and the shape of a float 19 is a rectangular shape. The other constituent elements of the coolant tank 11 are not different from those of the coolant tank 1, and therefore, the same constituent elements are denoted by the same reference numerals, and detailed description thereof is omitted.

The inner peripheral wall surface 12a1 of a side wall 12a of the tank main body 12 of the coolant tank 11 is rectangular. Further, the shape of an outer peripheral portion 19b of the float 19 is also rectangular corresponding to the shape of the inner peripheral wall surface 12a1. In this way, the float 19 can follow the shape of the inner peripheral wall surface 12a1 of the tank main body 12.

The float 19 in the coolant tank 11 has a plate shape, and a through-hole 19a is provided in a part of the float 19. The pump 5 is inserted into the through-hole 19a. The shape of the through-hole 19a is a shape to allow the outer peripheral portion 19b to come into contact with and be separated from the inner peripheral wall surface 12a1. In this way, when the coolant 3 is discharged from the introduction pipe 4, the float 19 moves, so that the outer peripheral portion 19b collides with the inner peripheral wall surface 12a1 to crush the bubbles of the coolant 3 or the masses of sludge. In this manner, also in the coolant tank 11, the same effect as that of the coolant tank 1 can be obtained.

In the examples described above, the shape of the inner peripheral wall surface of the tank main body and the shape of the outer peripheral portion of the float are circular or rectangular. However, the shape of the inner peripheral wall surface of the tank main body and the shape of the outer peripheral portion of the float are not limited to these shapes. For example, an elliptical shape or a triangular shape may be adopted. In this case, when the shape of the inner peripheral wall surface of the tank main body and the shape of the outer peripheral portion of the float are made similar to each other, the bubbles of the coolant 3 and the masses of sludge are easily crushed.

The embodiments described above are merely examples for implementing the disclosure, the disclosure is not limited to these embodiments, various modifications of these embodiments are within the scope of the disclosure, and it is obvious from the above description that various other embodiments can be made within the scope of the disclosure.

What is claimed is:

1. A coolant tank comprising:
   a tank main body configured to store a coolant discharged from a processing machine;
   a vortex flow generator that creates a vortex flow of the coolant in the tank main body; and
   a float configured to float on a liquid surface of the coolant stored in the tank main body and move on the liquid surface due to the vortex flow of the coolant to collide with an inner peripheral wall surface of the tank main body.

2. The coolant tank according to claim 1, wherein an outer peripheral portion of the float has a shape conforming to a shape of the inner peripheral wall surface of the tank main body and a shape being defined such that a gap between the outer peripheral portion and the inner peripheral wall surface is formed.

3. The coolant tank according to claim 1, wherein a shape of the inner peripheral wall surface of the tank main body and a shape of an outer peripheral portion of the float are shapes similar to each other.

4. The coolant tank according to claim 3, wherein each of the shape of the inner peripheral wall surface of the tank main body and the shape of the outer peripheral portion of the float is a circular shape.

5. The coolant tank according to claim 3, wherein each of the shape of the inner peripheral wall surface of the tank main body and the shape of the outer peripheral portion of the float is a rectangular shape.

6. The coolant tank according to claim 1, wherein the tank main body stores a coolant in which sludge is mixed.

* * * * *